US010221841B2

(12) United States Patent
Ho

(10) Patent No.: US 10,221,841 B2
(45) Date of Patent: Mar. 5, 2019

(54) FLUID PUMP

(71) Applicant: ODE (HK) Company Limited, Hong Kong SAR (CN)

(72) Inventor: Man Ting Ho, Hong Kong SAR (CN)

(73) Assignee: Ode (HK) Company Limited, Hong Kong SAR (CN)

( * ) Notice: Subject to any disclaimer, the term of this patent is extended or adjusted under 35 U.S.C. 154(b) by 221 days.

(21) Appl. No.: 15/070,260

(22) Filed: Mar. 15, 2016

(65) Prior Publication Data

US 2017/0268491 A1    Sep. 21, 2017

(51) Int. Cl.
| | | |
|---|---|---|
| F04B 17/04 | (2006.01) | |
| F04B 19/22 | (2006.01) | |
| F04B 53/10 | (2006.01) | |
| F04B 53/12 | (2006.01) | |
| F04B 53/14 | (2006.01) | |
| F04B 53/16 | (2006.01) | |
| A47J 31/46 | (2006.01) | |

(52) U.S. Cl.
CPC ............ *F04B 17/04* (2013.01); *F04B 17/044* (2013.01); *F04B 17/046* (2013.01); *F04B 19/22* (2013.01); *F04B 53/12* (2013.01); *F04B 53/125* (2013.01); *F04B 53/14* (2013.01); *F04B 53/146* (2013.01); *A47J 31/46* (2013.01); *F04B 53/1087* (2013.01); *F04B 53/16* (2013.01)

(58) Field of Classification Search
CPC ....... F04B 17/04; F04B 17/042–17/048; F04B 19/22; F04B 53/12; F04B 53/125; F04B 53/14; F04B 53/146; F04B 53/16

USPC ........ 417/415–417, 456, 458–459, 471, 545, 417/552–554, 555.1, 559, 562–563, 567

See application file for complete search history.

(56) References Cited

U.S. PATENT DOCUMENTS

| | | | | |
|---|---|---|---|---|
| 3,380,387 A * | 4/1968 | Kofink | ...................... | F02B 1/00 |
| | | | | 417/417 |
| 3,603,706 A * | 9/1971 | Cermak | .................. | F04B 17/04 |
| | | | | 417/417 |
| 4,102,610 A * | 7/1978 | Taboada | ................ | F04B 17/046 |
| | | | | 318/128 |
| 4,389,169 A * | 6/1983 | De Dionigi | ............ | H02K 33/02 |
| | | | | 310/30 |
| 4,743,179 A * | 5/1988 | Waas | ..................... | F04B 17/042 |
| | | | | 417/417 |
| 4,787,823 A * | 11/1988 | Hultman | ............... | F04B 17/046 |
| | | | | 310/27 |

(Continued)

FOREIGN PATENT DOCUMENTS

WO    WO 2008110187 A1 *  9/2008    ............ F04B 17/044

*Primary Examiner* — Alexander B Comley
(74) *Attorney, Agent, or Firm* — Leydig, Voit & Mayer

(57) ABSTRACT

A fluid pump has a housing, a chamber having an inlet and an outlet, an inlet valve, an outlet valve, and a plunger. The plunger has a plunger tube extending into the chamber and supported for movement, on a suction stroke, to introduce a fluid into the chamber via the inlet, and, on a discharge stroke, to displace the fluid from the chamber via the outlet. An electromagnetic driving unit moves the plunger in two opposite directions. A magnetic core is located adjacent the plunger for establishing a magnetic path across the electromagnetic driving unit and the plunger. The core is located in the path of movement of the plunger on the suction stroke, and is protected or covered by a material against contact with the fluid in the housing.

11 Claims, 5 Drawing Sheets

(56) References Cited

U.S. PATENT DOCUMENTS

2005/0025638 A1\* 2/2005 Buffet ................... F04B 17/046
                                                                417/416
2005/0089418 A1\* 4/2005 Bonfardeci ........... F04B 17/046
                                                                417/417
2007/0248475 A1\* 10/2007 Chan .................... F04B 17/046
                                                                417/410.1

\* cited by examiner

FLUID PUMP

The present invention relates to a fluid pump.

BACKGROUND OF INVENTION

Fluid pumps are in abundant use. For pumping pressurized water in a small electrical appliance, AC plunger pumps are often used, noticeably, in coffee machines or makers and in particular capsule coffee machines. Such plunger pumps are compact in size and are used with narrow hoses or pipes at their outlets where small valves are fitted for controlling the flow of water.

To minimize the size and cost of such fluid pumps, it is known that the pump housing is fitted with a magnetic core located adjacent the pumping plunger to maximize the magnetic permeability of the magnetic path from the electromagnetic driving unit to the plunger. The core is relatively expensive as it should be made of food-grade material. Also, where it is located too close to the plunger, the core is vulnerable to damage by impact of the plunger.

The invention seeks to obviate or at least alleviate such problems or shortcomings by providing a new or otherwise improved fluid pump.

SUMMARY OF THE INVENTION

According to the invention, there is provided a fluid pump comprising a housing, a chamber in the housing and having an inlet and an outlet, a first valve associated with the inlet, a second valve associated with the outlet, and a plunger in the housing. The plunger comprises a plunger tube extending into the chamber and supported for movement relative to the chamber on a suction stroke in one direction outwardly of the chamber to introduce fluid into the chamber via the inlet and on a discharge stroke in an opposite direction inwardly of the chamber to displace fluid out of the chamber via the outlet. Included is an electromagnetic driving unit adapted to cause said movement of the plunger in the housing in opposite directions relative to the chamber. There is a magnetic core in the housing and located adjacent the plunger for establishing a magnetic path across the driving unit and the plunger. The core is located in the path of movement of the plunger on a suction stroke. The core is protected or covered by material against contact with fluid in the housing.

Preferably, the core is enclosed or encased by the material.

More preferably, the core is tubular to allow fluid in the housing to pass through, having inner and outer sides that are both protected by the material.

It is preferred that the material is in the form of a jacket.

It is further preferred that the jacket is molded around the core.

It is yet further preferred that the jacket is molded with a part of the housing into shape, as an integral part of the housing.

Preferably, the driving unit comprises a winding wound on or around a core member, and the core includes an extension part of magnetic material. The extension part is exposed outside the material and in contact with the core member to establish a magnetic path for magnetic flux created by the winding to reach the core.

More preferably, the extension part comprises a disc having an aperture through which the core is inserted and secured.

Preferably, the driving unit comprises a winding wound on or around a core member, and the core includes an extension part of magnetic material, the extension part being exposed outside the material and in contact with the core member to establish a magnetic path for magnetic flux created by the winding to reach the core. The extension part comprises a disc having holes through which the material passes and interlocks with the disc.

In a preferred embodiment, the plunger and the core have respective parts confronting each other and contactable with each other on a suction stroke, the parts having complementary round shapes or profiles for contact.

Preferably, the part of the core is round by having an outer diameter, taken across its cross-section, gradually and smoothly reducing as the cross-section is taken in an outward direction from the part of the core.

More preferably, the part of the core has a smoothly curved or round periphery or outer rim.

Further more preferably, the part of the core has a pair of round or smoothly curved shoulders when viewed from one side.

It is preferred that the part of the plunger comprises a recess.

It is preferred that the first valve and the second valve are operable in the same first direction and closed in the same second direction opposite the first direction.

Preferably, the plunger tube has an open end extending into the chamber and a hollow passage which terminates at the open end and through which fluid is to be introduced into the chamber, with the open end acting as the inlet.

More preferably, the first valve comprises a first valve member and a first valve seat with which the first valve member is co-operable for valve operation, the first valve seat being provided by the open end of the plunger tube.

Preferably, the second valve comprises a second valve member and a second valve seat with which the second valve member is co-operable for valve operation, the second valve seat being provided by a restricted section of the chamber.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
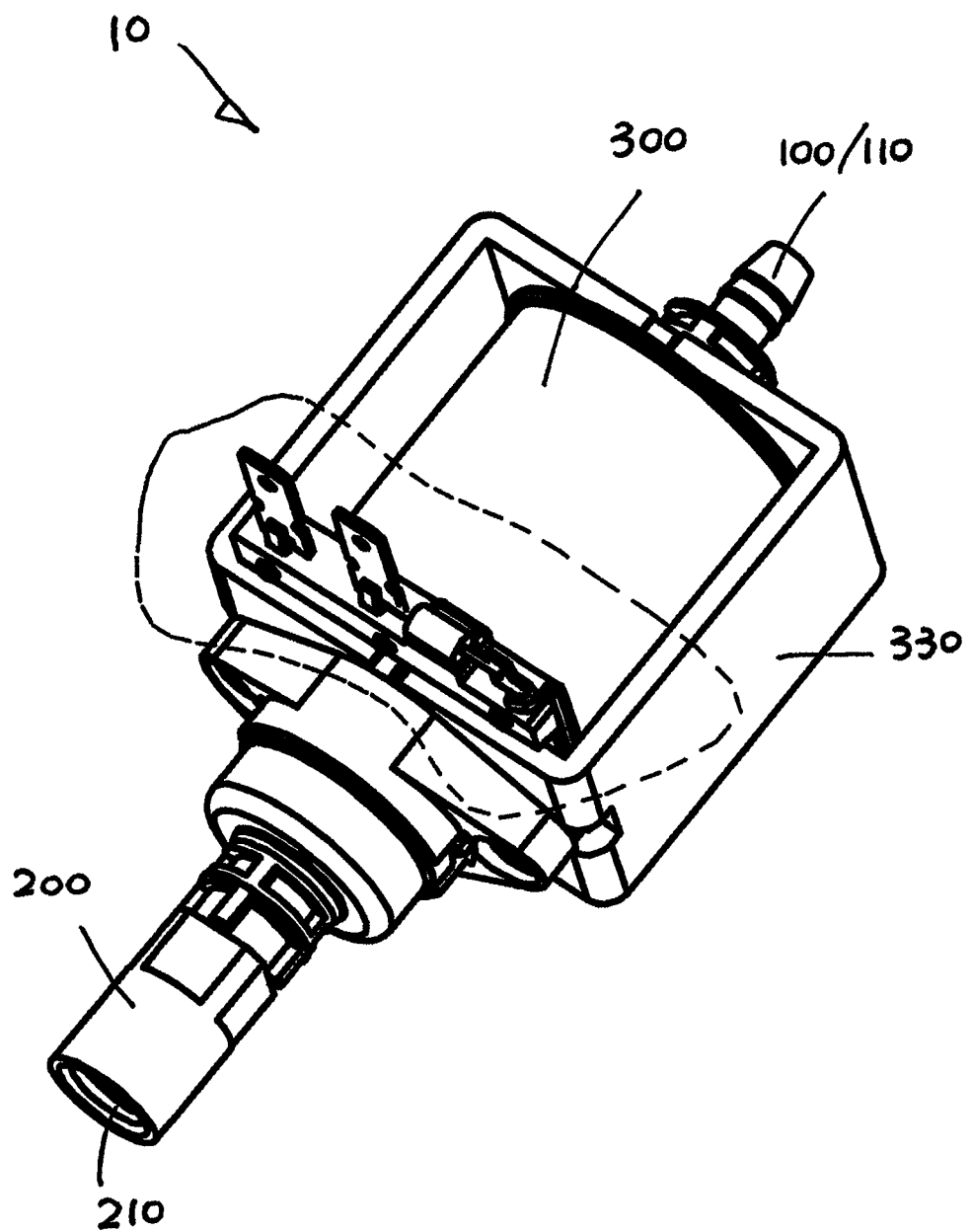
FIG. 1 is a perspective view of an embodiment of a fluid pump in accordance with the invention.
Figure 2:
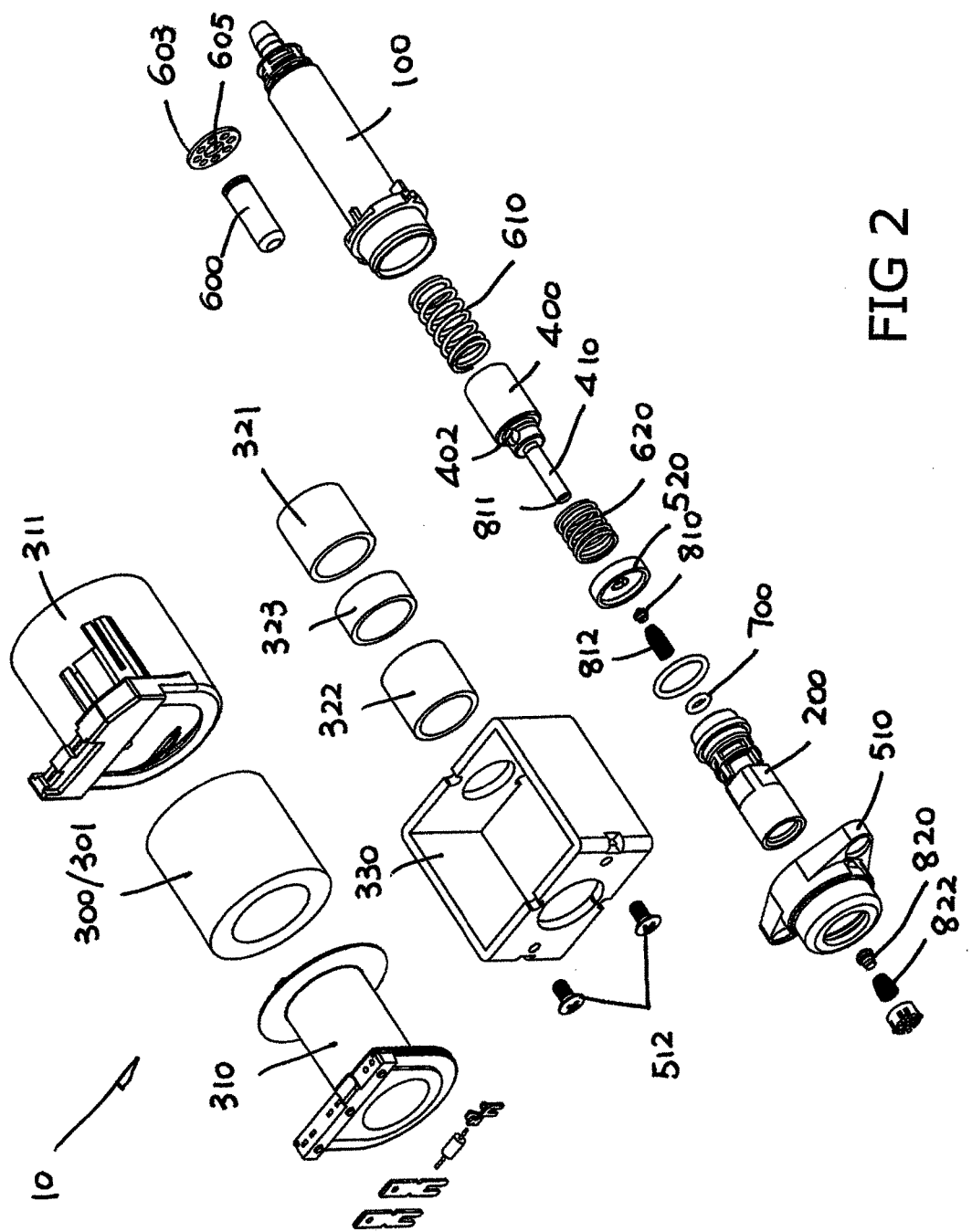
FIG. 2 is an exploded perspective view of the fluid pump of FIG. 1, showing the majority of its parts and components.
Figure 3:
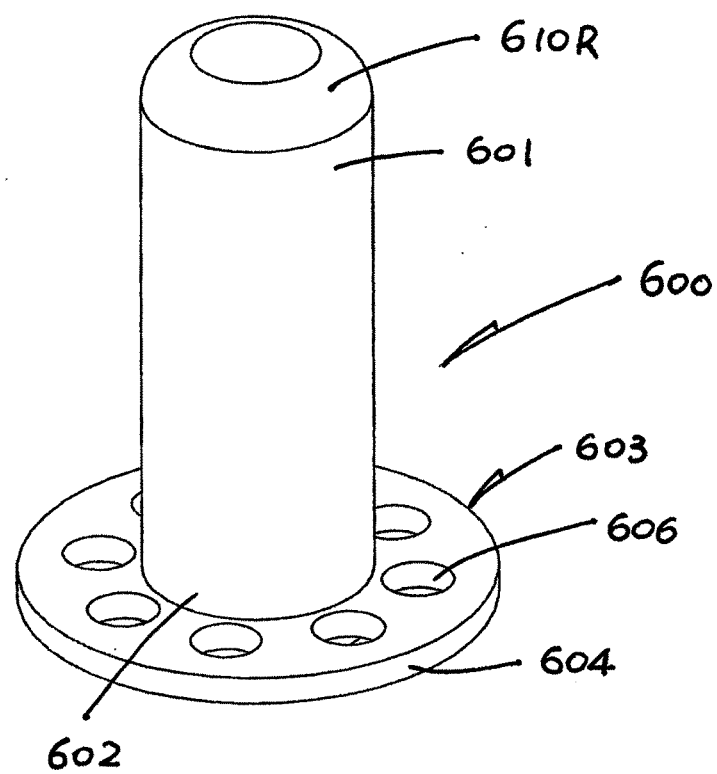
FIG. 3 is an enlarged perspective view of a metal core of an inlet tube of FIG. 3.
Figure 6:
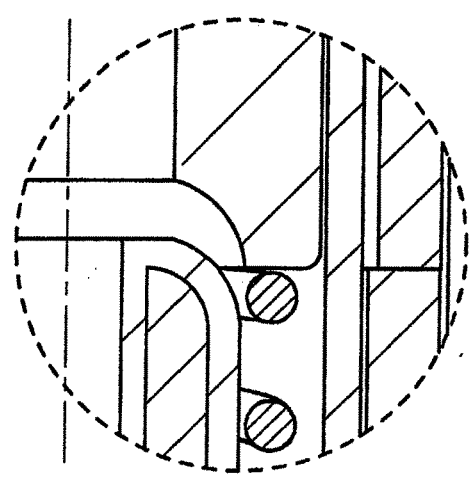
FIG. 6 is an enlarged view of part VI of the fluid pump of FIG. 5.

Referring to the drawings, there is shown a fluid pump 10 embodying the invention, which has a housing 100/200 comprising an inlet tube 100 and an outlet tube 200 jointed with the inlet tube 100, a winding 300 surrounding the inlet tube 100, and a tubular plunger 400 located within the inlet tube 100 for relative sliding movement upon electromagnetic interaction by the winding 300. The inlet and outlet tubes 100 and 200 are inter-connected end-to-end along and sharing a common central axis X, along which the plunger 400 extends.

The fluid pump 10 is intended for use in, for example, a capsule coffee machine for supplying pressurized hot water, at a pressure of say 9 to 10 Bars, to pass through and brew finely ground coffee held in a coffee capsule. The inlet tube 100 has, at its exposed end, a small tubular pump inlet 110 of the fluid pump 10 for connection by means of a hose to a source of fluid e.g. a water tank in a capsule coffee machine as described herein. The outlet tube 200 has, at its exposed end, a tubular pump outlet 210 of the fluid pump 10 for supplying pressurized hot water via a pipe to a coffee capsule in this example.

The inlet tube 100 has an interior that defines a generally cylindrical first chamber 103 having, at opposite ends thereof, an inlet end 101 and an outlet end 102. The outlet tube 200 has an inlet end 201 and an outlet end 202 and includes a central through bore with a section defining a generally cylindrical second chamber 203. Adjoining ends 102 and 201 of the inlet and outlet tubes 100 and 200 are externally joined together by means of a cap-like bracket 510 that is fixed by screws 512 onto a rectangular frame 330 that surrounds the winding 300. However, the adjoining ends 102 and 201 are internally isolated by an apertured partition 520 such that the inlet and outlet tubes 100 and 200 are in communication with each other only via a central aperture 521 of the partition 520.

The inlet tube 100 includes a tubular core 600 made of a magnetic material, which extends centrally within and occupies a lower end portion of the inlet tube 100. The core 600 is tubular to allow fluid in the housing 100/200, i.e. the inlet tube 100, to pass through. With the pump inlet 110 of the fluid pump 10 projecting outwardly from the inlet end 101 of the inlet tube 100, the core 600 projects inwardly into the inlet end 101 of the inlet tube 100 along the same axis X. This arrangement maintains a central passage through the pump inlet 110 for water to enter into the housing 100/200 of the fluid pump 10.

The core 600 has an inner/upper end 601 that is round and an outer/lower end 602 that is flat. The upper end 601 has a shape or profile that is round by having its outer diameter, taken across its cross-section, gradually and smoothly reducing as the cross-section is taken in an outward direction from the upper end 601. Hence, the upper end 601 has a smoothly curved or round periphery or outer rim 601R or, in other words, a pair of round or smoothly curved shoulders when viewed from one side. In contrary, the lower end 602 has a uniform outer diameter and a right-angled periphery or outer rim or a pair of right-angled shoulders when viewed from one side.

The core 600 is embedded and molded within the material of the inlet tube 100 and in particular the lower end portion of the inlet tube 100. This is done by over-molding the inlet tube 100 onto the core 600, with the core 600 placed as an insert inside the molds for forming the inlet tube 100. In the finished form, the core 600 is protected or covered by protection or cover material against contact with water in the outlet tube 100 or water flowing through the housing 100/200 of the fluid pump 10.

More specifically, the core 600 is enclosed or encased, both internally (i.e., within the core's central bore or over the core's inner surface) and externally (i.e., over the core's outer surface) by the aforesaid protection or cover material, and in particular a relatively thin layer of the material. In short, the core 600 has inner and outer sides that are both protected by the material. The material or layer of material is preferably in the form of jacket 601 that is an integral part of, i.e. integrally formed with, the inlet tube 100. In other words, the jacket 601 is molded around the core 600, and is molded with a part of the housing 100/200, i.e. the inlet tube 100, into shape, as an integral part of the housing 100/200.

At and around its outer end 602, the core 600 is fitted with an extension part in the form of an annular disc 603 made of an annular magnetic material, such as the same material as the core 600. The annular disc 603 is pre-attached to the core 600 in the central aperture 605, before the core 600, together with the annular disc 603, is molded within the material of the inlet tube 100. The annular disc 603 is exposed outside the material of the jacket 601 by having a periphery or outer rim 604 which is fully exposed and protrudes, over 360° around, out of the adjoining surface of the inlet tube 100 and the jacket 601 (for contacting with the iron tube 321).

The annular disc 603 has a central aperture 605 through which the core's outer end 602 is inserted and then secured therewith by, for example, a forging process using a power hammer or a die that expands the outer end 602, such that the annular disc 603 is in direct contact with the core 600 as if they were integrally formed together. The annular disc 603 is perforated with a ring of peripheral holes 606 around it, through which the material of the inlet tube 100 passes and, hence, interlocks with the annular disc 603.

The core 600 is protected by the jacket 601 against contact with or by water in the inlet tube 100 or, in general, water flowing through the fluid pump 10. The jacket 601 has a uniform thickness and acts as part of the core 600, i.e., the skin of the core 600. The provision of the jacket 601 enclosing the core 600 allows the use of a non-food-grade metal material to make the core 600, such that its magnetic properties, i.e., magnetic permeability, can be maximized without compromise on such properties and/or material cost. The use of part of the inlet tube 100 to make the jacket 601 also simplifies the production and reduces the associated cost.

The plunger 400 has a main body made of a magnetic material and is located generally within and guided by the inlet tube 100 for axial sliding movement in opposite upward and downward directions, upon electromagnetic interaction by the winding 300. The plunger 400 is being acted upon, at opposite ends of its main body, by a pair of coil springs i.e. main and bumper springs 610 and 620. While acting upon opposite ends of the main body of the plunger 400, the springs 610 and 620 are compressed between, and within, the upper and lower ends of the inlet tube 100.

Figure 4:
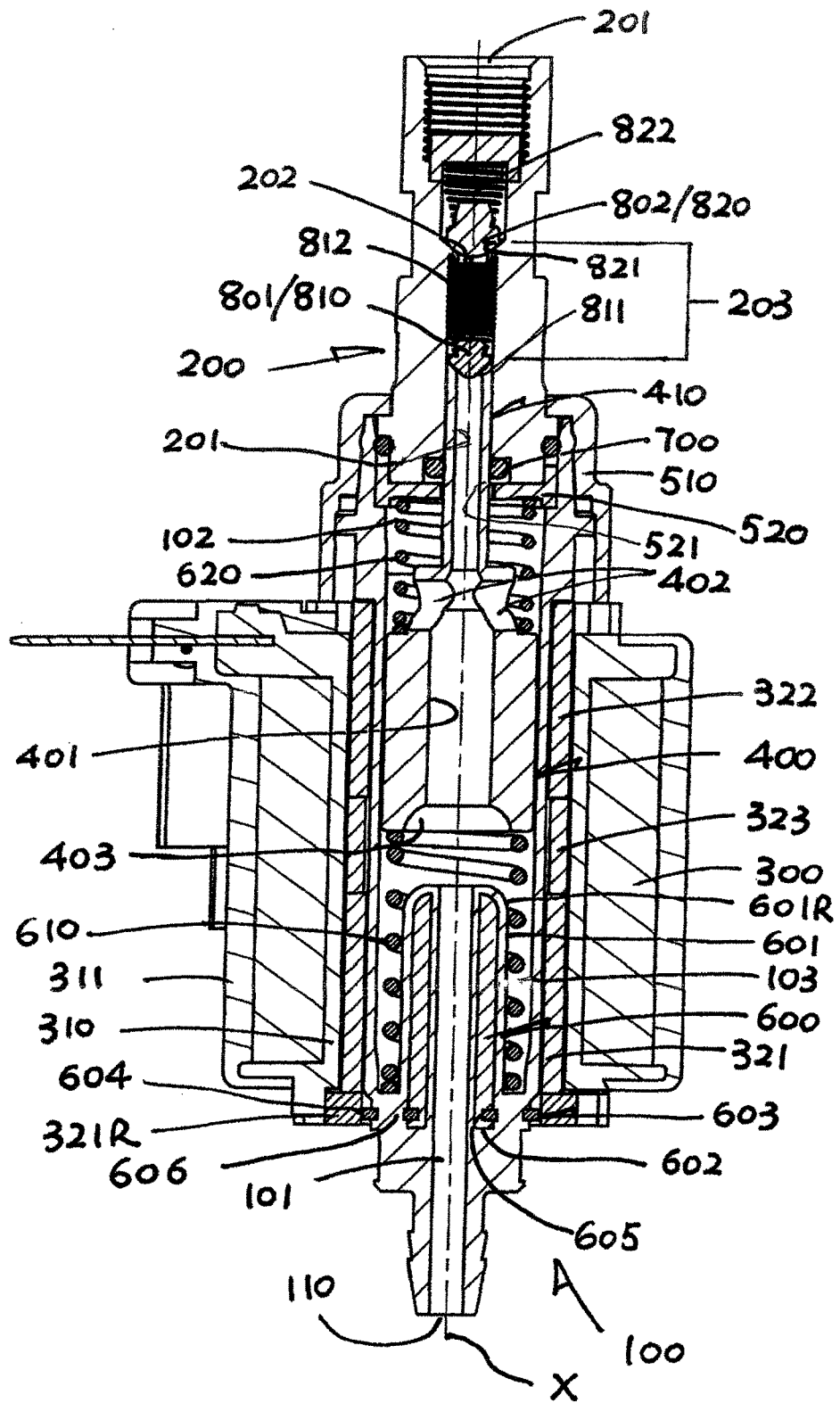
FIG. 4 is a cross-sectional side view of the fluid pump of FIG. 1, showing the fluid pump in operation at stationary point.
Figure 5:
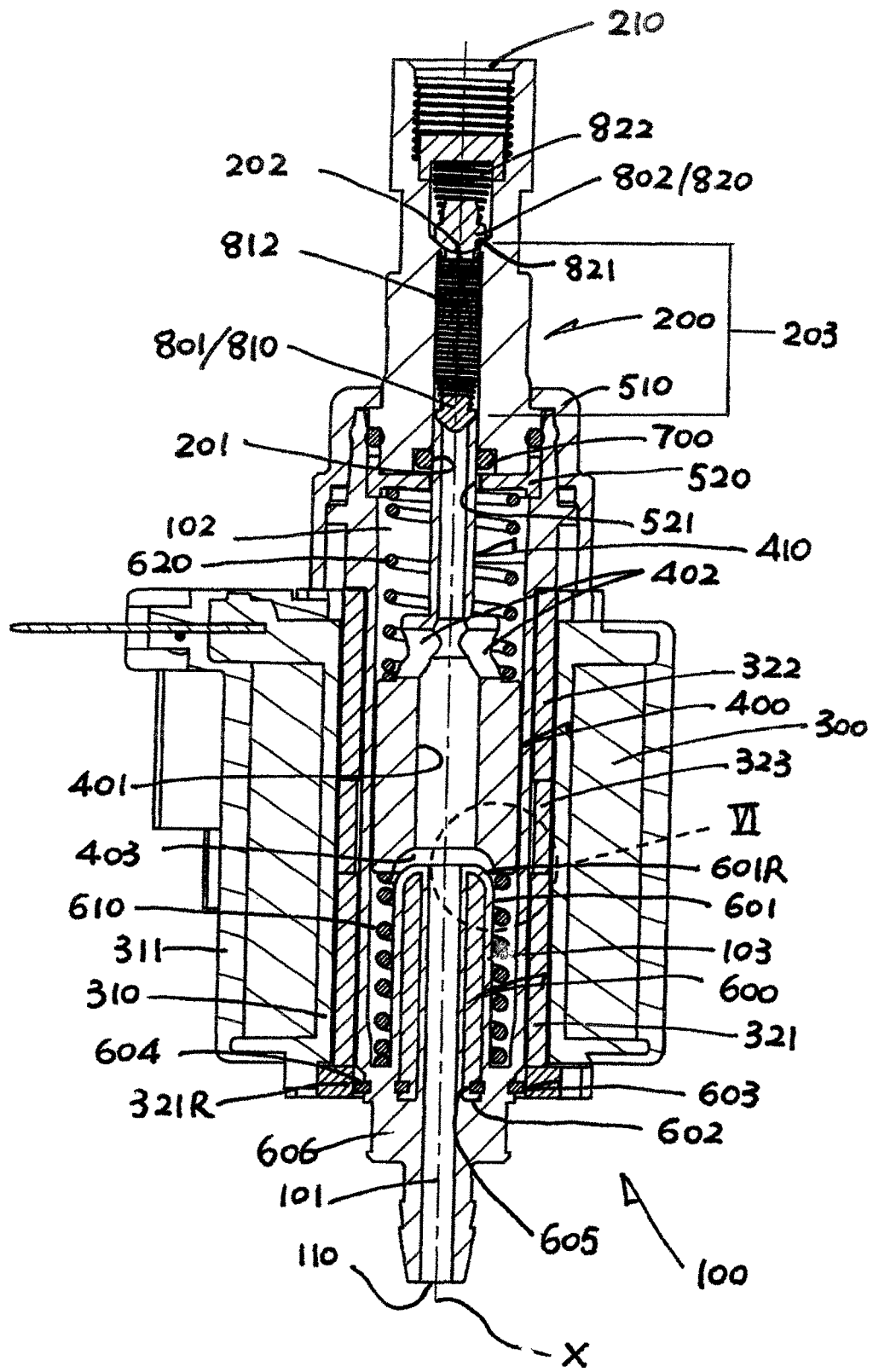
FIG. 5 is a cross-sectional side view corresponding to FIG. 4, showing the fluid pump in operation at operation point.

The springs 610 and 620 at rest locate the plunger 400 at an equilibrium position (FIG. 4) which is offset, upwardly along the central axis X, from the winding 300. In this equilibrium position, the plunger 400 occupies an upper end portion of the inlet tube 100, being in co-axial alignment with the core 600 below and spaced apart from the core 600 by a predetermined distance.

The plunger 400 has a front end which projects from the main body and is reduced into a much narrower tube referred to as plunger tube 410 that extends upwardly to the chamber 203 of the outlet tube 200 via the inlet end 201 fitted with an O-ring 700 and the aperture 521 of the partition 520.

The main spring 610 is disposed on and around the core 600 right below the plunger 400. The bumper spring 620 is disposed on and around the plunger tube 410, over an inner end portion of the plunger tube 410 situated within the inlet tube 100.

The fluid pump 10 further includes a plunger valve 801 associated with the plunger tube 410 of the plunger 400 and an outlet valve 802 associated with the pump outlet 210 of the fluid pump 10 at a position downstream of the plunger valve 801. The plunger valve 801 and the outlet valve 802 are resiliently biased by respective coil springs 812 and 822 in the same direction, inwardly of the fluid pump 10, in order normally to close the plunger tube 410 and the pump outlet 210. Both valves 801 and 802 are one-way valves that are openable, against the action of the respective springs 812 and 822, in the direction of flow of fluid driven by the plunger 400 in action through the fluid pump 10.

The winding 300 is formed by a copper coil 301 wound on a bobbin 310 and protected by a casing 311 over-molded onto the coil 301 and the bobbin 310. The winding 300 surrounds the main body of the magnetic plunger 400 and acts upon the plunger 400 to drive the same, together constituting an electromagnetic driving unit that in essence comprises a solenoid. On the inner side of the bobbin 310, there are arranged, co-axially along the central axis X, two magnetic core members in the form of iron tubes 321 and 322 spaced apart by a plastic ring 323. The two iron tubes 321 and 322 are core members on or around which the winding 300 is wound to increase the magnetic field created by the winding 300. They are spaced apart by the plastic ring 323 to provide separate magnetic paths for the magnetic field to act upon the plunger 400.

Returning briefly to the core 600, the outer rim 604 of its disc 603 protrudes out and is in contact with the lower iron tube 321 either directly or, in this particular construction, via a magnetic, iron ring 321R as shown. This establishes a magnetic path for the magnetic flux created by the winding 300 through the iron tube 321 and iron ring 321R to reach the core 600.

Upon energization by the AC mains power, the winding 300 intermittently, during each positive half cycle of the AC current, attracts to pull the plunger 400 downwardly against the action of the main spring 610, which is thus compressed, and a suction stroke is performed. During each negative half cycle, the AC current is cut by electronic control or a simple diode to de-energize the winding 300 and in turn release the main spring 610. The main spring 610 will upon release push the plunger 400 back in the opposite upward direction, thereby returning the plunger 400 to its original upper position, resulting in a discharge stroke. The bumper spring 620 provides a buffer for soft landing of the plunger 400.

While being guided by the inlet tube 100 for axial sliding movement in opposite directions as described above, the plunger 400 carries with it the plunger tube 410 for corresponding sliding movement relative to the chamber 203 in the outlet tube 200. The plunger 400 with the plunger tube 410 is to be driven by the winding 300 of the driving unit into reciprocation axially, or in opposite directions vertically as shown, along the inlet tube 100.

The plunger 400 has a central through bore 401 which extends from the lowermost end of the plunger 400 through to the uppermost end of the plunger tube 410. The bore 401 is a hollow passage that terminates at the uppermost end of the plunger tube 410. At this position, the uppermost or free end of the plunger tube 410 acts as an inlet to the inlet tube's chamber 203, through which water is to be introduced into the chamber 203. The outlet end 202 acts as the outlet of the chamber 203 and is located slightly upstream of the pump outlet 210 of the fluid pump 10.

The bore 401 allows water from the interior of the inlet tube 100 below the plunger 400, entered via the pump inlet 110, to flow lengthwise upward through the plunger 400, including the plunger tube 410, into the chamber 203. A pair of side holes 402 through the wall of the plunger 400 intersecting the bore 401 allows communication and thus pressure balance between the interior of the inlet tube 100 below and above the plunger 400.

Water enters the chamber 203 via the inlet end 201 and associated plunger valve 801, and exits via the outlet end 202 and associated outlet valve 802. The two valves 801 and 802 are one-way valves that are openable in the same direction of flow of water through the chamber 203 and are closed in the same reversed direction.

The plunger valve 801 has a plunger valve member 810 and an plunger valve seat 811, with which the valve member 810 is co-operable for valve operation, under the action of the spring 812 that resiliently biases the valve member 810 downwards against the valve seat 811. The valve seat 811 is provided by the open end of the plunger tube 410.

The outlet valve 802 is formed by an outlet valve member 820 and an outlet valve seat 821, with which the valve member 820 is co-operable for valve operation, under the action of the spring 822 that resiliently urges the valve member 820 downwards against the valve seat 821. The valve seat 821 is provided by a restricted section of the chamber 203, in the form of an annular inner flange around the chamber's inner surface.

The chamber 203 occupies the space in the section of the outlet tube 200 between the plunger valve 801 and the outlet valve 802. The plunger valve 801 is located upstream (below as shown) of the outlet valve 802. The plunger and outlet valves 801 and 802, with their valve members 810 and 820, are aligned co-axially with each other and with the outlet tube 200 and hence the chamber 203.

In operation, upon the vertical reciprocation of the plunger 400 by the electro-magnetic winding 300 as described above, the plunger tube 410 performs pumping actions within the chamber 203, co-operating with the inlet and outlet valves 801 and 802, in repeated cycles of suction and discharge strokes.

On each suction stroke in the downward direction outwardly of the chamber 203, the plunger 400 with the plunger tube 410 is withdrawn downward by the winding 300 to introduce water by suction into the chamber 203 via the inlet end 201, with the plunger valve 801 being opened as the plunger tube 410 and hence the valve seat 811 recedes from the valve member 810, while the outlet valve 802 remains shut. The plunger 400 stops upon the bottom of its main body engaging, e.g. touching or hitting, the upper end 601 of the core 600.

Right afterward, on the following discharge stroke in the opposite direction inwardly of the chamber 203, the plunger tube 410 charges forward to compress the water in the chamber 203 and then, when the water pressure sufficiently builds up (i.e. reaching the threshold pressure) to open the outlet valve 802, displaces the pressurized water out of the chamber 203 via the outlet end 202, while the plunger valve 801 now remains shut.

The strength of the outlet valve spring 822 is a key factor that determines the extent to which water is to be pressurized, for example to a pressure from 0.7 Bar to 10 Bars. The distance of travel of the plunger tube 410 dictates the volume of water to be discharged per pumping cycle.

Each suction stroke ends when the bottom of the plunger 400 engages the upper end 601 of the core 600. As described above, the core's upper end 601 has a shape or profile that is round by having its outer diameter, taken across its cross-section, gradually and smoothly reducing as the cross-section is taken in an upward direction from the upper end

601. Hence, the upper end 601 has a smoothly curved or round periphery or outer rim, with a pair of round or smoothly curved shoulders when viewed from one side.

The plunger 400 has a relatively shallow recess 403 in the bottom of its main body, which has a shape or profile complementary to or matching the afore-described shape or profile of the upper end 601 of the core 600.

This complementary or matching shape or profile between the upper end 601 of the core 600 and the bottom of the plunger 400 has a number of advantages. Firstly, by having complementary round shapes or profiles, the bottom of the plunger 400 and the upper end 601 of the core 600, upon coming in contact at the end of a suction stroke, will be subject to an impact with minimum damage. The impact will be flat and even. Any misalignment of the bottom of the plunger 400 from the upper end 601 of the core 600 will be self-corrected.

Secondly, the area of confronting or contacting surfaces between the bottom of the plunger 400 and the upper end 601 of the core 600, which are concave and convex respectively, is maximized by reason of the curvature. This results in improved magnetic permeability of the magnetic path between the bottom of the plunger 400 and the upper end 601 of the core 600, making it possible to reduce the size and cost of the winding 300.

The invention has been given by way of example only, and various modifications of and/or alterations to the described embodiment may be made by persons skilled in the art without departing from the scope of the invention as specified in the appended claims.

The invention claimed is:

1. A fluid pump for pumping a fluid, the fluid pump comprising:
   a housing including first and second chambers in fluid communication with each other, wherein the second chamber includes an inlet for admitting the fluid into the second chamber to be pumped, and an outlet for discharging the fluid that has been pumped;
   first and second valves respectively associated with the inlet and the outlet of the second chamber;
   a tubular plunger disposed in the first and second chambers of the housing, wherein
      the tubular plunger comprises a main body disposed in the first chamber and a plunger tube extending from the main body and into the second chamber, wherein the tubular plunger is supported in the first and second chambers for sliding movement relative to the first and second chambers,
      the plunger tube slides, on a suction stroke, in a first direction, outwardly of the second chamber and inwardly of the first chamber, to introduce the fluid into the second chamber via the inlet, and
      the plunger tube slides, on a discharge stroke, in a second direction, opposite the first direction, inwardly of the second chamber and outwardly of the first chamber, to displace the fluid from the second chamber and the pump, via the outlet; an electromagnetic driving unit producing the sliding movement of the tubular plunger in the first and second chambers of the housing in the first and second directions, wherein the electromagnetic driving unit comprises a bobbin, a core member in contact with the bobbin, and a winding wound on or around the bobbin;
   a tubular magnetic core located within the first chamber and adjacent the tubular plunger for establishing a magnetic path across the electromagnetic driving unit and the tubular plunger, wherein the magnetic core is located in a movement path of the tubular plunger for stopping the tubular plunger in the suction stroke;
   a protection material contacting and encasing the tubular magnetic core and preventing direct contact of the tubular magnetic core by the fluid in the first chamber; and
   an annular disc of a magnetic material having a central aperture in which an end of the tubular magnetic core is mounted, wherein part of the annular disc, which is not covered by the protection material, is in contact with the core member, as part of the magnetic path.

2. The fluid pump as claimed in claim 1, wherein
   the tubular magnetic core includes a central passage for flow of the fluid into the first chamber through the tubular magnetic core, so that the tubular magnetic core has inner and outer surfaces, and
   the protection material contacts and covers both of the inner and outer surfaces, thereby encasing the tubular magnetic core.

3. The fluid pump as claimed in claim 1, wherein
   the tubular plunger and the tubular magnetic core have respective end parts confronting each other, and contacting each other in a suction stroke, and
   the end parts have complementary convex and concave shapes for contacting each other.

4. The fluid pump as claimed in claim 3, wherein
   the end part of the tubular magnetic core is convex and has an outer diameter, in cross-section, and
   the outer diameter decreases as cross-sections are taken in an outward direction of the end part of the tubular magnetic core.

5. The fluid pump as claimed in claim 3, wherein the end part of the plunger is concave and comprises a recess.

6. The fluid pump as claimed in claim 1, wherein the first and second valves are both opened by flow of the fluid in one direction relative to the second chamber and closed against flow of the fluid in another direction, opposite the one direction.

7. The fluid pump as claimed in claim 1, wherein the plunger tube has an open end opening into the second chamber and a hollow passage which terminates at the open end and through which the fluid is introduced into the second chamber.

8. The fluid pump as claimed in claim 7, wherein
   the first valve comprises a valve member and a valve seat with which the valve member is co-operable for valve operation, and
   the valve seat comprises the open end of the plunger tube.

9. The fluid pump as claimed in claim 1, wherein
   the second valve comprises a valve member and a valve seat with which the valve member is co-operable for valve operation, and
   the valve seat comprises a restricted section of the second chamber.

10. A fluid pump for pumping a fluid, the fluid pump comprising:
    a housing including first and second chambers in fluid communication with each other, wherein the second chamber includes an inlet for admitting the fluid into the second chamber to be pumped, and an outlet for discharging the fluid that has been pumped;
    first and second valves respectively associated with the inlet and the outlet of the second chamber;
    a tubular plunger disposed in the first and second chambers of the housing, wherein the tubular plunger comprises a main body disposed in the first chamber and a plunger tube extending from the main body and into the second chamber, wherein the tubular plunger is supported in the first and second chambers for sliding movement relative to the first and second chambers, the plunger tube slides, on a suction stroke, in a first direction, outwardly of the second chamber and inwardly of the first chamber, to introduce the fluid into the second chamber via the inlet, and the plunger tube slides, on a discharge stroke, in a second direction, opposite the first direction, inwardly of the second chamber and outwardly of the first chamber, to displace the fluid from the second chamber and the pump, via the outlet; an electromagnetic driving unit producing the sliding movement of the tubular plunger in the first and second chambers of the housing in the first and second directions, wherein the electromagnetic driving unit comprises a bobbin, a core member in contact with the bobbin, and a winding wound on or around the bobbin;

a tubular magnetic core located within the first chamber and adjacent the tubular plunger for establishing a magnetic path across the electromagnetic driving unit and the tubular plunger, wherein the magnetic core is located in a movement path of the tubular plunger for stopping the tubular plunger in the suction stroke; and a protection material contacting, encasing, and molded onto the tubular magnetic core and preventing direct contact of the tubular magnetic core by the fluid in the first chamber; and an annular disc of a magnetic material having a central aperture in which an end of the tubular magnetic core is mounted, wherein part of the annular disc, which is not covered by the protection material, is in contact with the core member, as part of the magnetic path, and the annular disc includes a plurality of peripheral holes through which the protection material passes.

11. The fluid pump as claimed in claim 10, wherein the protection material molded onto the tubular magnetic core extends from the tubular magnetic core and forms part of the first chamber, as an integral part of the first chamber.

* * * * *